3,040,068
PROCESS FOR THE PREPARATION OF N-ALKYL-17-AMINO-1,3,5(10)-ESTRATRIEN-3-OLS

Isso Chuman, 2370 1-chome, Araijuku, Oota-ku, Tokyo, Japan; Masanobu Sawai, 193 Kakinokizaka, Meguro-ku, Tokyo, Japan; and Yasushi Suzuki, 127 Shirahata Minami-cho, Yokohama, Japan
No Drawing. Filed Nov. 17, 1959, Ser. No. 853,462
Claims priority, application Japan Nov. 22, 1958
5 Claims. (Cl. 260—397.5)

The present invention relates to new N-alkyl-17-amino-1,3,5(10)-estratrien-3-ol, and its derivatives which are represented by the following structural formula and to a process for the preparation thereof.

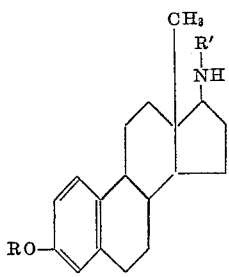

In the above formula R is selected from hydrogen, acyl group, such as acetyl and propionyl, and a lower alkyl group such as methyl and ethyl. Meanwhile, R' is a lower alkyl group such as methyl and ethyl.

Concrete compounds are 17-methylamino-1,3,5(10)-estratrien-3-ol and 17-ethylamino-1,3,5(10)-estratrien-3-ol, their 3-acetates, 3-propionates, 3-methyl ethers and 3-ethyl ethers. These compounds have not been reported in the literature and have not only antibiotic action against coli bacillus and tubercle bacillus but also excellent trichogeneous action. Compounds as exemplified by the foregoing formula may be produced in the following way. The Schiff bases of steroids can be prepared, for instance, by passing methylamine into the anhydrous ethanolic solution of a ketone such as pregnenolone or by adding the saturated amine solution in an organic solvent such as ethanol, allowing the mixture to stand in a dark and cold place for 3 to 4 days. The resulted Schiff bases are reduced to produce the corresponding amines. The necessity of storing the mixture in a dark and cold place in the latter process is to prevent side reactions such as resinification.

This method requires not only a considerable amount of solvent and reagent but gives a poor yield as low as 10% after the long period. Hence the process is generally not practical.

This invention does not possess such a defect and is a process which gives the said amines easily, safely, in a short period and with a high yield.

In the present invention, the following reactions may take place:

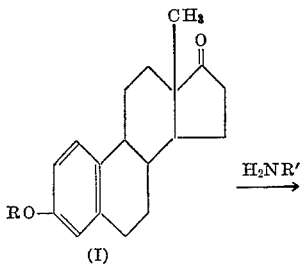

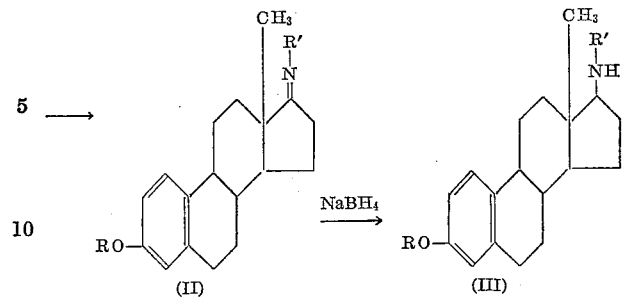

In the above equation R and R' represent organic groups as mentioned before.

In the present invention, the method of treatment for the preparation of the Schiff base is selected according to the nature of the starting amine.

Amines which are either gas at the room temperature or are low-boiling, such as methylamine and ethylamine, are placed under pressure with the steroid in order to dissolve the steroid in the liquified amine. The amount of the amine may be in excess and preferably 10 times of the steroid by volume. Since it is advisable to maintain the reaction mixture homogeneous, the use of this amount of the amine and that of an autoclave or a pressure bottle are necessary. If the steroid is not completely soluble in the amine, the organic solvents, such as methanol, ethanol, benzene and ethyl ether, which do not interfere with the reactions, may be used. Sodium sulfate and quaternary ammonium salts may also be added as catalysts. The reaction proceeds smoothly at the room temperature but heating may be applied if necessary. Inside pressure of the autoclave is determined by the vapor pressure of the amine but the process is operative up to 20 atm. when heated. The unreacted amine may be easily and completely recovered after the reaction.

The high-boiling amine, such as propylamine and butylamine, does not necessarily require an autoclave or a pressure bottle. The process can be carried out in a suitable solvent such as benzene either at the room temperature or by heating.

The process may be also performed by adding amine salt such as hydrochloride and sulfate and basic materials such as sodium carbonate and potassium carbonate to a solution of the steroid in an organic solvent such as benzene either at the room temperature or at higher temperature. Amines used in the process of the present invention may be primary but the secondary amines are not suitable. For the reduction of Schiff bases, sodium boron hydride in ethanol is preferable but lithium aluminum hydride in anhydrous ether and metallic sodium in alcohol may be satisfactorily used, giving N-alkyl-17-amino-1,3,5(10)-estratrien-3-ol or its ethers.

The following specific examples serve to illustrate the present invention.

The first process: The preparation of Schiff bases from steroids.

Example 1

A solution of 1 gr. of estrone, small amount of calcium chloride and 15 cc. methylamine in 15 cc. benzene is heated at 70° C. for 6 hours in a pressure bottle. After the reaction, the unreacted methylamine is recovered by distillation and the residue is treated with 20 cc. of water. The benzene layer is separated, washed with water and dried with anhydrous sodium sulfate. Removal of the solvent and recrystallization gives 980 mg. 17-methylimino-1,3,5(10)-estratrien-3-ol, needles. It decomposes at 271° C. and has ultraviolet absorption maximum at 281 m$\mu$ with a molecular extinction coefficient of 2740 in ethanol.

Example 2

1 gr. of estrone acetate, 15 cc. of ethanol and 15 cc. of methylamine are allowed to react in a pressure bottle at 60° C. for 3 hours. After the reactions, methylamine is recovered and 20 cc. of water is added to the residue. The residue is extracted with benzene. The benzene layer is washed with water, dried with anhydrous sodium sulfate and evaporated. The residue is recrystallized from methanol to give 910 mg. 17-methylimino-1,3,5(10)-estratrien-3-ol.

Example 3

In an autoclave, 1 gr. of estrone 3-methyl ether is dissolved in 10 cc. liquified methylamine and allowed to stand overnight. Methylamine is distilled off and the residue crystallized from methanol to give 0.9 gr. 17-methylimino-1,3,5(10)-estratrien-3-ol 3-methyl ether, colorless needles. It decomposes above 157° C. and has the following ultraviolet absorption maximum in ethanol: 224 m$\mu$ ($\epsilon$=11500), 278 m$\mu$ ($\epsilon$=2490) and 289 m$\mu$ ($\epsilon$=2300).

Example 4

2 gr. of estrone, 2 gr. of anhydrous sodium carbonate, 2 gr. of ethylamine hydrochloride and 30 cc. of benzene are heated for 5 hours in an esterification apparatus. Water is added to the mixture which is extracted with benzene. The benzene layer is treated as mentioned above and evaporated. The residue is recrystallized from methanol to give 1.05 gr. 17-ethylimino-1,3,5(10)-estratrien-3-ol, colorless needles. It decomposes at 235° C. and has an ultraviolet absorption maximum at 280 m$\mu$ with a molecular extinction coefficient of 2310 in ethanol.

The second process: The preparation of N-alkyl-17-amino-1,3,5(10)-estratrien-3-ol or its alkyl ethers.

Example 5

500 mg. of 17-methylimino-1,3,5(10)-estratrien-3-ol and 500 mg. of sodium boron hydride in 20 cc. anhydrous ethanol are boiled for 3 hours and the solution concentrated to half of the original volume. Unreacted sodium boron hydride is decomposed with acetic acid and water added. The crystals are collected and recrystallized from acetone to give 460 mg. 17-methylamino-1,3,5(10)-estratrien-3-ol, colorless needles. It melts at 240–241° C. and has an ultraviolet absorption maximum at 281 m$\mu$ with a molecular extinction coefficient of 1865 in ethanol.

Example 6

A solution of 500 mg. of 17-methylimino-1,3,5(10)-estratrien-3-ol 3-methyl ether and 1 gr. of sodium boron hydride in anhydrous ethanol is stirred overnight. Acetic acid is added to the solution and ethanol evaporated. The residue is treated with water and filtered. The crystals are recrystallized from ethanol to give 420 mg. 17-methyl-amino-1,3,5(10)-estratrien-3-ol 3-methyl ether, colorless prisms. It melts at 122° C. and has the following ultraviolet absorption maxima in ethanol: 226 m$\mu$ ($\epsilon$=10700), 278 m$\mu$ ($\epsilon$=2150), 289 m$\mu$ ($\epsilon$=1680).

Example 7

3 gr. of sodium metal is added to a hot solution of 1 gr. of 17-ethylimino-1,3,5(10)-estratrien-3-ol in isopropyl alcohol. The solvent is removed in vacuo and the residue is acidified with 2 N hydrochloric acid. The crystals are taken up in benzene and the solution is shaken with aqueous ammonia. The benzene layer is washed with water, treated at the room temperature and evaporated. The residue is recrystallized from ethanol to give 570 mg. 17-ethylamino-1,3,5(10)-estratrien-3-ol, colorless needles. It melts at 164° C. and has an ultraviolet absorption maximum at 281 m$\mu$ with a molecular extinction coefficient of 2470 in ethanol.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. The process of preparation of Schiff base exemplified by the general formula

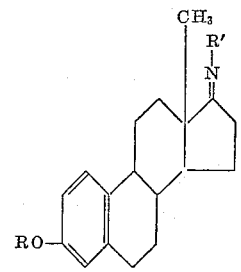

wherein R is selected from the group consisting of hydrogen and lower alkyl radicals and R' is a lower alkyl radical, by dissolving 17-keto-1,3,5(10)-estratrien-3-ol and its derivatives represented by the formula

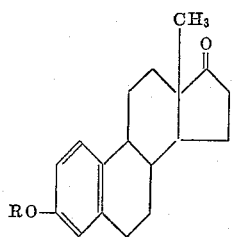

wherein R is selected from the group consisting of hydrogen, acyl radicals, and lower alkyl radicals, in a lower primary amine, R'NH$_2$, wherein R' is a lower alkyl group, and recovering the unreacted amine after the reaction is completed.

2. The process of claim 1 wherein an organic solvent is used as a solvent to dissolve the starting materials.

3. The process for the production of the compounds having the structural formula

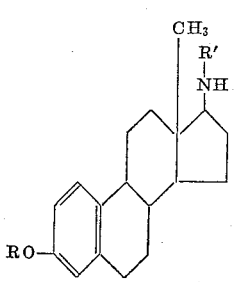

wherein R is a member selected from the group consisting of hydrogen and lower alkyl radicals and R' is a member selected from the group consisting of lower alkyl radicals, which comprises reducing the Schiff base exemplified by the general formula

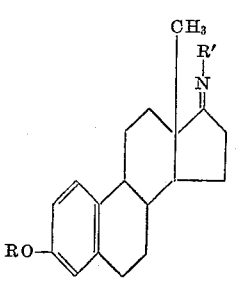

wherein R is selected from the group consisting of hydrogen and lower alkyl radicals and R' is a member selected from the group consisting of lower alkyl radicals by sodium boron hydride in ethanol.

4. The process for the production of the compounds having the structural formula

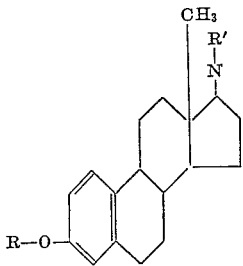

wherein R is a member selected from the group consisting of hydrogen and lower alkyl radicals and R' is a member selected from the group consisting of lower alkyl radicals, which comprises reducing the Schiff base exemplified by the general formula

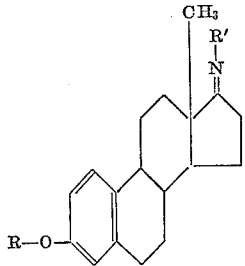

wherein R is a member selected from the group consisting of hydrogen and lower alkyl radicals and R' is a member selected from the group consisting of lower alkyl radicals by metallic sodium in alcohol.

5. The process of preparation of Schiff base exemplified by the general formula

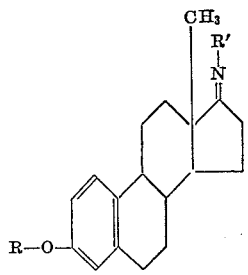

wherein R is a member selected from the group consisting of hydrogen and lower alkyl radicals and R' is a member selected from the group consisting of lower alkyl radicals, by reacting a solution of 17-keto-1,3,5(10)-estratrien-3-ol and its derivatives represented by the formula

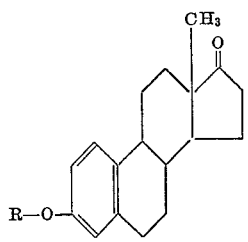

wherein R is a member selected from the group consisting of hydrogen, acyl radicals and lower alkyl radicals, with a salt of a lower primary amine of the formula R'NH$_2$·A, wherein R' is lower alkyl and A stands for a member selected from the group consisting of hydrochloric acid and sulfuric acid, in an organic solvent in the presence of alkali metal carbonate.

References Cited in the file of this patent

Lettre' et al.: Chem. Abst., vol. 37, 5785 (1943).
Shoppee et al.: J. Chem. Soc. (London), January 1959, pp. 345–56.
Royals: Advanced Organic Chemistry (1954), page 650.